(No Model.)
T. T. HEATH & A. N. VERDIN.
FRICTION CLUTCH.
No. 553,983. Patented Feb. 4, 1896.
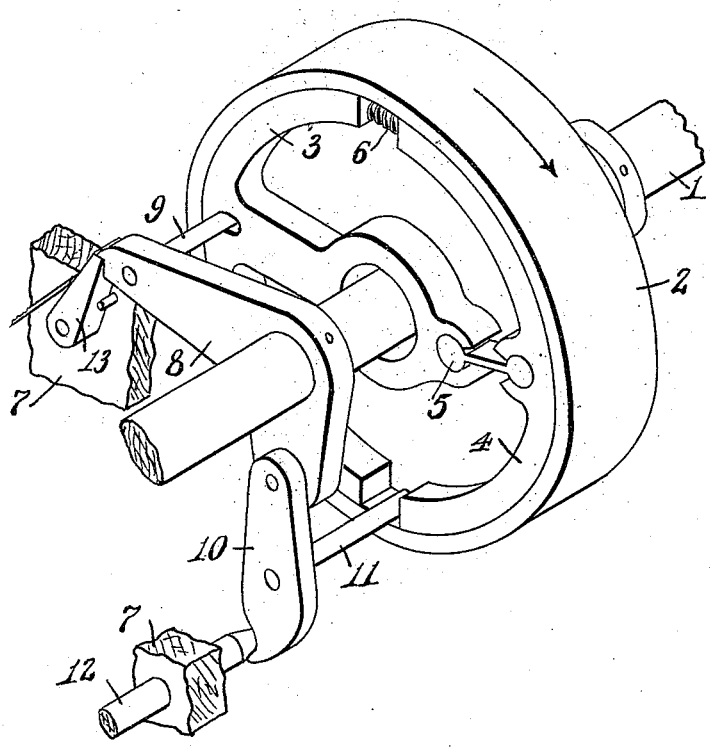
Witnesses:
E. R. Shipley.
C. M. Sheehan.
Thomas T. Heath
Alois N. Verdin
Inventor
by James W. See
Attorney

UNITED STATES PATENT OFFICE.

THOMAS T. HEATH, OF LOVELAND, AND ALOIS N. VERDIN, OF GLENDALE, OHIO; SAID VERDIN ASSIGNOR TO SAID HEATH.

FRICTION-CLUTCH.

SPECIFICATION forming part of Letters Patent No. 553,983, dated February 4, 1896.

Application filed March 1, 1894. Renewed August 19, 1895. Serial No. 559,802. (No model.)

*To all whom it may concern:*

Be it known that we, THOMAS T. HEATH, of Loveland, Clermont county, and ALOIS N. VERDIN, of Glendale, Hamilton county, Ohio, have invented certain new and useful Improvements in Friction-Clutches, of which the following is a specification.

This invention pertains to improvements in friction-clutches, and will be readily understood from the following description, taken in connection with the accompanying drawing, which is a perspective view of a friction-clutch exemplifying our invention.

In the drawings, 1 indicates the shaft which the clutch is to drive; 2, the pulley, free to turn on the shaft and having its rim bored to form an internal cylindrical friction-surface; 3, a friction-segment fitting with this rim and extending about half-way around within the rim, this segment having a hub upon but entirely free from the shaft, the hub being connected to the segment by an arm; 4, an opposite friction-segment without arm or hub; 5, a link connecting the two segments and acting togglewise to expand the segments when segment 4 is turned forward with reference to segment 3, the normal position of this segment when the clutch is disengaged being one of flexure—that is to say, its outer pivot is the rear of a line radial to the shaft, the link in this position holding the segments inward sufficiently to be free from driving engagement with the rim of the pulley; 6, a spring inserted in one of the gaps between the ends of the two segments and tending to shift the two segments circumferentially in opposite directions and straighten the link 5; 7, fixed parts near the clutch, which parts may be portions of the stationary framing of any machine or mounting in connection with which the clutch is to be employed; 8, a carrier fast on the shaft near the face of the segments; 9, a pin carried by this carrier and projecting into a radial slot in segment 3; 10, an arm pivoted to carrier 8; 11, a pin projecting from this arm into that one of the gaps between the ends of the segments opposite the gap occupied by spring 6; 12, a pin mounted in a fixed part 7 and adapted to be moved endwise into or out of the path swept by arm 10, this pin 12 being normally in the position shown—that is to say, in position to arrest the arm 10, and 13 a spring-pawl mounted on a fixed part 7 and adapted to engage behind carrier 8 and prevent retrograde motion of the carrier.

The parts are shown in normal position with the friction-segments disengaged from the pulley-rim and the pulley assumed as revolving continuously in the direction of the arrow. The friction-segments do not turn, because they are not in engagement with the pulley-rim. If they were in frictional enengagement with the pulley-rim they could not turn, because pin 11 restrains segment 4 from turning, and pin 12 restrains the arm that carries the pin. If segment 3 should start to turn with the pulley the effect would be to increase the flexure of link 5 and still further contract the friction-segments. Therefore in the normal condition the shaft has neither tendency nor capacity to turn with the pulley.

If pin 12 be withdrawn endwise, free from arm 10, then the clutch would automatically go into action. Pin 11 will then no longer restrain segment 4, and spring 6 will advance segment 4 a trifle with relation to segment 3. The effect of this advance of segment 4 is to tend to straighten the link 5, which, acting togglewise, expands the segments and causes them to take a grip in the pulley-rim, whereupon the segments turn with the pulley, and pin 9 drives carrier 8 and consequently the shaft. The pulley therefore drives the shaft through one segment (segment 3) through the medium of pin 9. If the shaft tends to resist the turning, segment 3 is the one that first slips, and the tendency of this slipping is to still further straighten the toggle-link and still further apply the expansive force to the grip of the friction-segment. Consequently the harder the work to be done the greater will be the frictional force with which the clutch will drive. Let it be particularly noticed that while force was required to withdraw the pin 12 from its obstructing position that force was no measure of the force with which the clutch would take its grip. The withdrawal of pin 12 was merely an act giving permission to the clutch to automatically engage with force derived directly from the revolving pulley. Controlling-pin 12 is therefore to be viewed not as a device for forcing the clutch into action, but as a device for permitting the clutch to go into action. If the end of pin 12 be tapered, as indicated in the drawing, the pin need be withdrawn but a trifling distance, and the pressure of arm 10 on the taper will force the pin back to balance of the required distance to clear the arm. Thus a rather delicate withdrawing movement given to the pin will cause the clutch instantly to engage.

If, while the rotary parts are all in motion by reason of the engagement of the clutch, the pin 12 be protruded into engaging position, the arm 10 will strike the pin, and consequently segment 4 will be arrested sharply, which arrest will result in the flexing of link 5 and the contraction of the friction-segments and the releasing of the clutch. The disengagement of the clutch is therefore sharp in character as is the engagement, and the engagement and release take place at a fixed point in the rotation of the shaft. This quality fits the clutch in a superior degree for use in that class of machines requiring a sharply-defined starting and arresting of a shaft and in which jaw-clutches usually employed for the purpose are objectionable on account of their noise and shock.

In some uses of this clutch it may be desirable that after the shaft is arrested it shall be incapable of any retrogressive motion, and, again, the turning velocities may be such as to produce rebound of the carrier when arrested by pin 12. In such case spring-pawl 13 may be employed, which pawl goes into action at the time of arrest and prevents any retrograde motion of the shaft.

It is to be observed that various parts act in certain relationship with the direction of motion of the pulley, as indicated by the arrow. For a reverse direction of motion of the pulley other parts will require to be correspondingly reversed in arrangement. It is to be noticed that spring 6, while it has been placed, in the exemplification, in position to act directly upon the segments to turn them in opposite directions when at liberty to do so, is virtually an agent merely to force link 5 preliminarily toward the straightening position, and it will be observed that any location or arrangement of the spring to produce this preliminary straightening tendency on the part of the link will fulfill the office of the spring. Pin 11 in the exemplification engages the advanced end of segment 4; but the office of this pin is fulfilled if it engages this segment at any point to resist its advance, or if it engages in any manner to resist the straightening of link 5.

While we have illustrated our clutch as being employed for connecting a loose pulley with a shaft, it will be obvious to the mechanic that the system is capable of being employed in connection with any two rotary parts, one of which is to be engaged with the other at will—as, for instance, a loose gear and its shaft, or the two relatively loose halves of a shaft-coupling.

We claim as our invention—

1. In a friction-clutch, the combination, substantially as set forth, of a friction-rim, a pair of friction-segments therein, a link engaging the two segments and acting togglewise to expand them against the rim, a spring tending to expand the segments, a carrier connected with one of said segments so as to partake of all the rotary motions of said segment, an arm engaged by the second segment so as to partake of its rotary motion independent of the first segment, and an obstructing piece in fixed position and adapted to be moved into and out of the path of said arm so as to release or restrain said spring.

2. In a friction-clutch, the combination, substantially as set forth, of a friction-rim, a pair of friction-segments therein, a link connecting the segments and acting togglewise to expand them in the friction-rim, a spring tending to urge said link to position corresponding with greater expansion of the segments, a movable arresting device in fixed position to resist the action of said spring, and a carrier connected with that one of the two segments which the spring tends to urge backwardly.

3. In a friction-clutch, the combination, substantially as set forth, of a shaft, a friction-rim loose thereon, a pair of friction-segments within said rim, a link engaging the two segments and acting togglewise to expand them, a spring tending to expand the segments, a carrier fast on the shaft and engaging one of said segments, an arm carried by said carrier and engaged by the other segment, and a movable arresting-piece to engage said arm.

4. In a friction-clutch, the combination, substantially as set forth, of a friction-rim, a pair of segments therein, a link engaging the two segments and acting togglewise to expand them, a spring tending to expand the segments, a carrier connected with one of the segments, an arm carried by said carrier and engaged by the other segment, a movable arresting-piece to engage said arm, and a pawl to engage said carrier in its position of arrest and prevent its retrograde motion.

THOMAS T. HEATH.
ALOIS N. VERDIN.

Witnesses:
M. B. FERRIS,
I. J. MILLER.